United States Patent [19]

Skuratovsky

[11] Patent Number: 4,792,206

[45] Date of Patent: Dec. 20, 1988

[54] METHOD AND APPARATUS FOR ALIGNING FIBER OPTIC CABLES

[75] Inventor: Eugene Skuratovsky, Mayfield Heights, Ohio

[73] Assignee: The Babcock & Wilcox Company, New Orleans, La.

[21] Appl. No.: 57,189

[22] Filed: Jun. 1, 1987

[51] Int. Cl.[4] .............................................. G02B 6/38
[52] U.S. Cl. ............................... 350/96.21; 350/96.15
[58] Field of Search ................ 350/96.15, 96.20, 96.21

[56] References Cited

U.S. PATENT DOCUMENTS 3,938,895  2/1976  Bridger et al. ............... 350/96.20 X
3,999,841  12/1976  Dakss et al. ................ 350/96.20 X
4,678,271  7/1987  Beaulièu .......................... 350/96.20

Primary Examiner—John D. Lee
Assistant Examiner—Phan T. Heartney
Attorney, Agent, or Firm—Eric Marich; Vytas R. Matas; Robert J. Edwards

[57] ABSTRACT

A dual cantilever beam member for aligning optical fiber cables is disclosed. A first optical fiber cable is received through and attached to one end of the beam member while a second optical fiber cable is received through and attached to the other end of the beam member causing the ends of the optical fiber cables to be in close proximity to one another. The dual cantilever construction of the beam member allows relative displacement of the one optical fiber cable with respect to the other optical fiber cable along only one co-ordinate axis and prevents relative displacement of the optical fiber cables along the other co-ordinate axes. A chord shaped portion on the end of each optical fiber cable is blocked to define the transmission area between the cable ends and to increase displacement sensitivity of the device.

12 Claims, 8 Drawing Sheets

METHOD AND APPARATUS FOR ALIGNING FIBER OPTIC CABLES

TECHNICAL FIELD

The present invention relates generally to apparatus for aligning the ends of optical fiber cables and more particularly to apparatus which permits the ends of the optical fiber cables to be displaced only along one co-ordinate axis and provides for increasing the sensitivity of detecting such relative displacement.

BACKGROUND ART

Optical fibers are used extensively in displacement sensor technology. One method of obtaining a displacement measurement is to attach a first optical fiber cable to the object whose displacement is to be sensed while a second optical fiber cable, whose end is aligned with the end of the first optical fiber cable, is held stationary. One of the optical fiber cables has a light source attached to its other end while the other of the optical fiber cables has a light receiver attached to its other end. When the object is displaced, the light coupling between the two optical fiber cables changes, thus changing the amount of light received by the light receiver from the light source.

An inherent problem associated with the foregoing optical fiber sensor apparatus is the alignment of the ends of the optical fiber cables relative to one another along the three co-ordinate axes. When measured displacement occurs along the X axis, sensitivity of the sensor depends on the relative position of the ends of the optical fiber cables along this axis. If the ends of the optical fiber cables are misaligned along this axis by more than the diameter of the cables, no signal is transmitted through the cables. The resulting sensitivity of the sensor also depends on misalignment of the ends of the optical fiber cables along the Y axis. In addition, the intensity of the light transmitted depends on the closeness of the ends of the optical fiber cables, i.e., the alignment of the cables along the Z axis.

Because of the foregoing, it has become desirable to develop apparatus for aligning the ends of optical fiber cables which permits displacement along only one co-ordinate axis and which has a high degree of sensitivity to such displacement.

SUMMARY OF THE INVENTION

The present invention solves the aforementioned problems associated with the prior art as well as other problems by providing a dual cantilever beam member having a first optical fiber cable encased in one end thereof and a second optical fiber cable encased in the other end thereof. The ends of the optical fiber cables are in close proximity within the opening defined by the web sections which interconnect the oppositely disposed ends of the cantilever beam member. The cantilever beam member permits relative displacement of one optical fiber cable with respect to the other optical fiber cable along only one co-ordinate axis and prevents relative displacement between the optical fiber cables along the other co-ordinate axes. A chord shaped portion of the end of each optical fiber cable is blocked so as to define the transmission area between cable ends and increase the sensitivity of the apparatus.

DESCRIPTION OF THE PREFERRED EMBODIMENT

Figure 1:
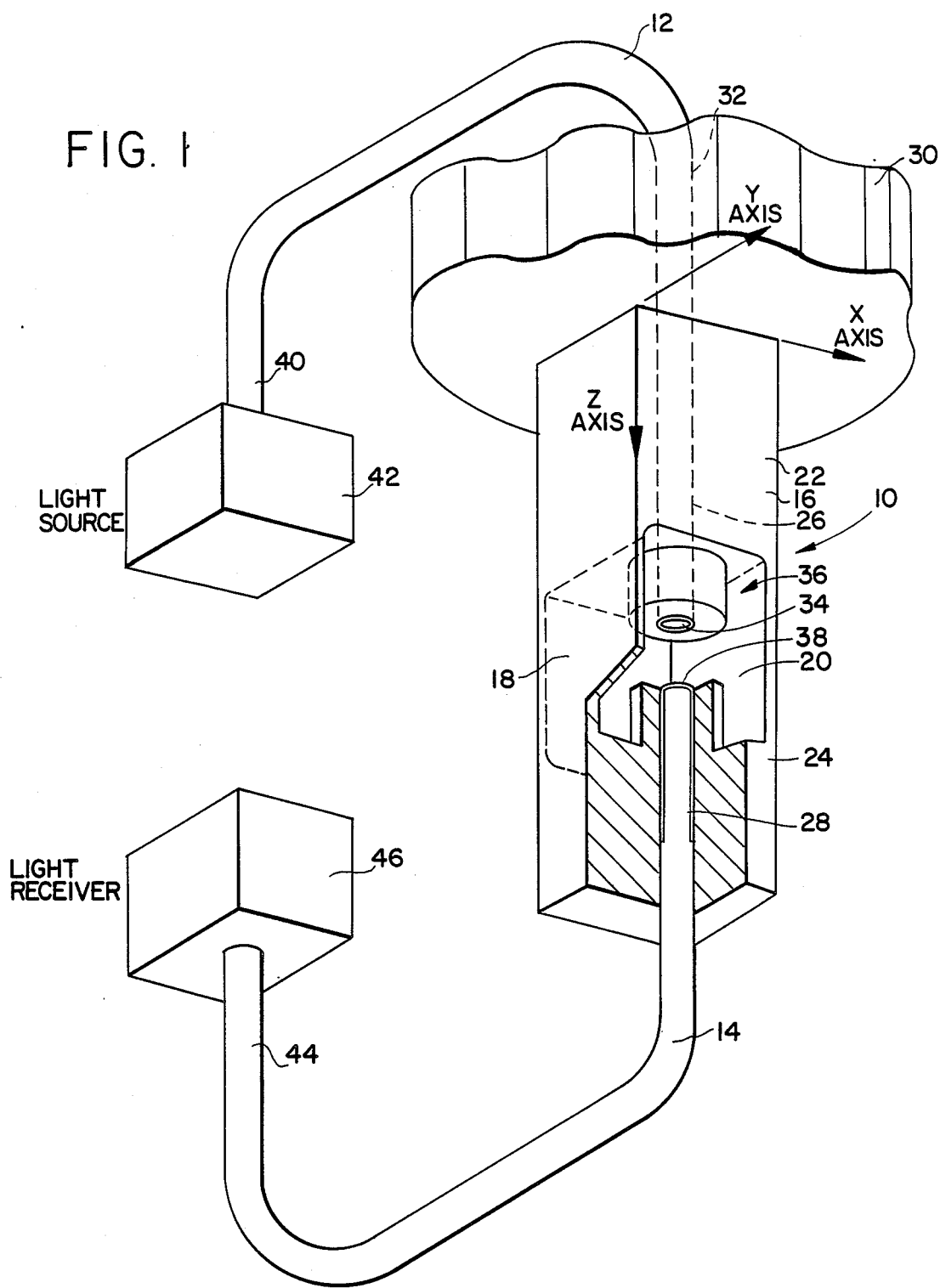
FIG. 1 is a perspective view of the present invention.

Referring now to the drawings where the illustrations are for the purpose of describing the preferred embodiment of the present invention and are not intended to limit the invention described herein, FIG. 1 is a perspective view of an apparatus 10 for aligning the ends of optical fiber cables 12 and 14 through the use of a beam member 16 which keeps the ends of the optical fiber cables 12 and 14 in a spaced apart relationship.

The beam member 16 is of a dual cantilever beam construction having oppositely disposed web sections 18 and 20 interconnecting end sections 22 and 24. Aligned bores 26 and 28 are provided in end sections 22 and 24, respectively, of the beam member 16. End section 22 is attached to a fixed member 30 permitting end section 24 to be displaced along the X axis with respect thereto. Fixed member 30 has an aperture 32 therein aligned with bore 26 in end section 22. Optical fiber cable 12 is received through aperture 32 in fixed member 30 and is firmly encased within bore 26 so that its end 34 is positioned within the opening, shown generally by the numeral 36, between the web sections 18 and 20. Similarly, optical fiber cable 14 is received through and firmly encased within bore 28 in end section 24 so that its end 38 is positioned within the opening 36. Since the bores 26 and 28 are aligned along the Y axis, the ends 34 and 38 of the respective optical fiber cables 12 and 14 are similarly aligned. The distance between the ends 34 and 38 of the optical fiber cables 12 and 14 is maintained as small as possible. It has been found that a distance of between 0.001–0.002 inches provides best results.

The opposite end 40 of optical fiber cable 12 is connected to a light source 42. Similarly, the opposite end 44 of the optical fiber cable 14 is connected to a light receiver 46.

In operation, end section 24 of the beam member 16 is attached to a movable body (not shown), displacement of which is to be measured along the X axis. When such displacement occurs along the X axis, end section 24 also moves resulting in lateral displacement along the X axis of the end 38 of optical fiber cable 14 with respect to the end 34 of optical fiber cable 12. Movement of the end 38 of optical fiber cable 14 along the Y and Z axes is mechanically restrained by the structure of the beam member 16. When alignment between the ends 34 and 38 of optical fiber cables 12 and 14, respectively, is achieved, light from light source 42 passes through optical fiber cables 12 and 14 and is received by the light receiver 46. Calibration of alignment can be achieved by adjusting either end section 22 or 24 of the beam member 16 with respect to the X axis in order to obtain repeatability of alignment.

From the foregoing it is apparent that displacement along the X axis of the movable body to which end section 24 of the beam member 16 is attached varies the light coupling between the ends 34, 38 of the respective optical fiber cables 12, 14. Thus, the amount of light intercepted by the light receiver 46 is a function of the amount of displacement of the movable body along the X axis.

Figure 2:
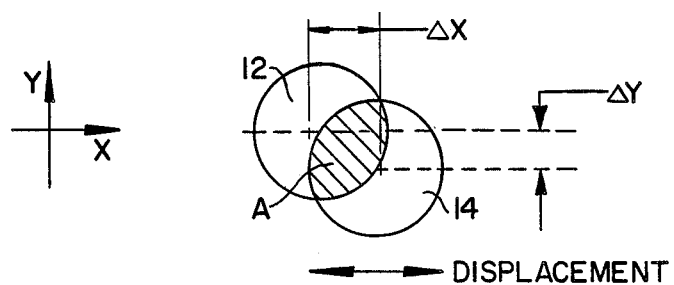
FIG. 2 is a cross-sectional view of two optical fiber cables illustrating misalignment of the cables along the X and Y axes and also showing the common transmission area A between the two optical fiber cables.

In the foregoing apparatus, as in any optical fiber sensor design, sensitivity is highly dependent on the alignment of the optical fiber cable ends 34 and 38 along both the X and Y axes. Referring to FIG. 2, which shows misalignment between the ends 34 and 38 of respective optical fiber cables 12 and 14, misalignment along the X axis is shown as $\Delta X$ and misalignment along the Y axis is denoted as $\Delta Y$. Relative transmission between cables is defined as the ratio of transmission area A to the total cross-sectional area of optical fiber cable 12 or optical fiber cable 14. When there is no misalignment between the ends 34 and 38 of the respective optical fiber cables 12 and 14, relative transmission between the cables is assigned the numeral 1 and relative sensitivity is assigned the numeral 2 which is the maximum achievable.

Figure 4:
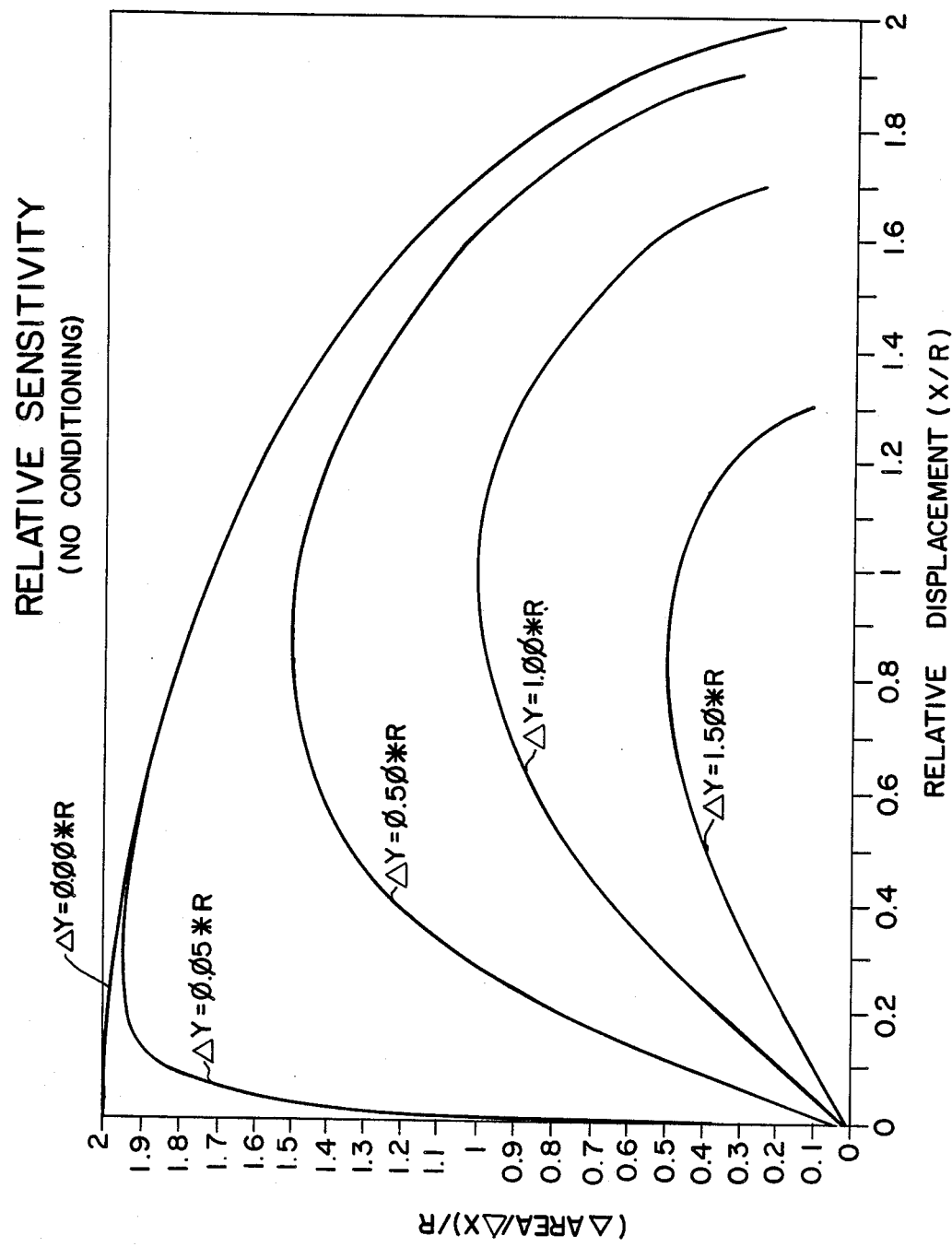
FIG. 4 is a graph of relative sensitivity versus displacement of a pair of misaligned optical fiber cables having ends that are not blocked.

In practice, $\Delta X$ and $\Delta Y$ misalignments of the optical fiber cable ends could reach up to 1.5 times the radius R of the core of the optical fiber due to a tolerance stack-up. This results in a sensitivity of 0.5 or less as shown in FIG. 4. It has been found that prior art optical fiber alignment apparatuses often produce inadequate levels of sensitivity which hinders performance. It is also obvious from FIG. 4 that, for a given $\Delta Y$ misalignment, careful adjustment of relative position of the ends of the optical fiber cables along the X axis is required to achieve a maximum (or close to a maximum) sensitivity level.

Figure 3:
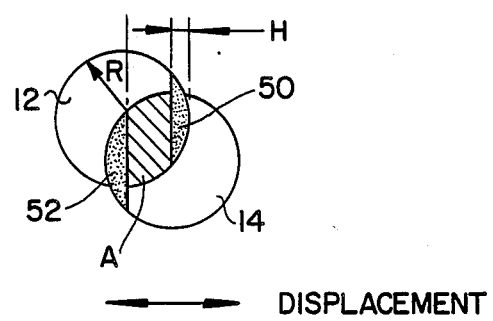
FIG. 3 is a cross-sectional view of two optical fiber cables each having a chord shaped portion of their ends blocked by a light absorbing/reflecting film and showing the common transmission area A therebetween.

In order to improve sensitivity characteristics of the apparatus 10 shown in FIG. 1, and to reduce the effects of misalignment along the X axis, a chord shaped portion 50 of the end 34 of optical fiber cable 12 is blocked, as shown in FIG. 3. Similarly, a chord shaped portion 52 of the end 38 of optical fiber cable 14 is also blocked. The foregoing chord shaped portions 50 and 52 are positioned perpendicularly to the axis of displacement being measured and are located on opposite sides of the cable ends 34 and 38. Blocking of these portions 50 and 52 of the optical fiber cable ends 12 and 14 can be achieved by depositing light absorbing/reflecting film on the portion of the cable end to be blocked. When the portions of the optical fiber cable ends have been so blocked, displacement between the optical fiber cable end 34 and 38 causes the transmission area defined by the letter A to change more rapidly than in FIG. 2. Thus, blockage of a portion of the optical fiber cable ends 34 and 38 increases the sensitivity of the apparatus.

Figure 5:
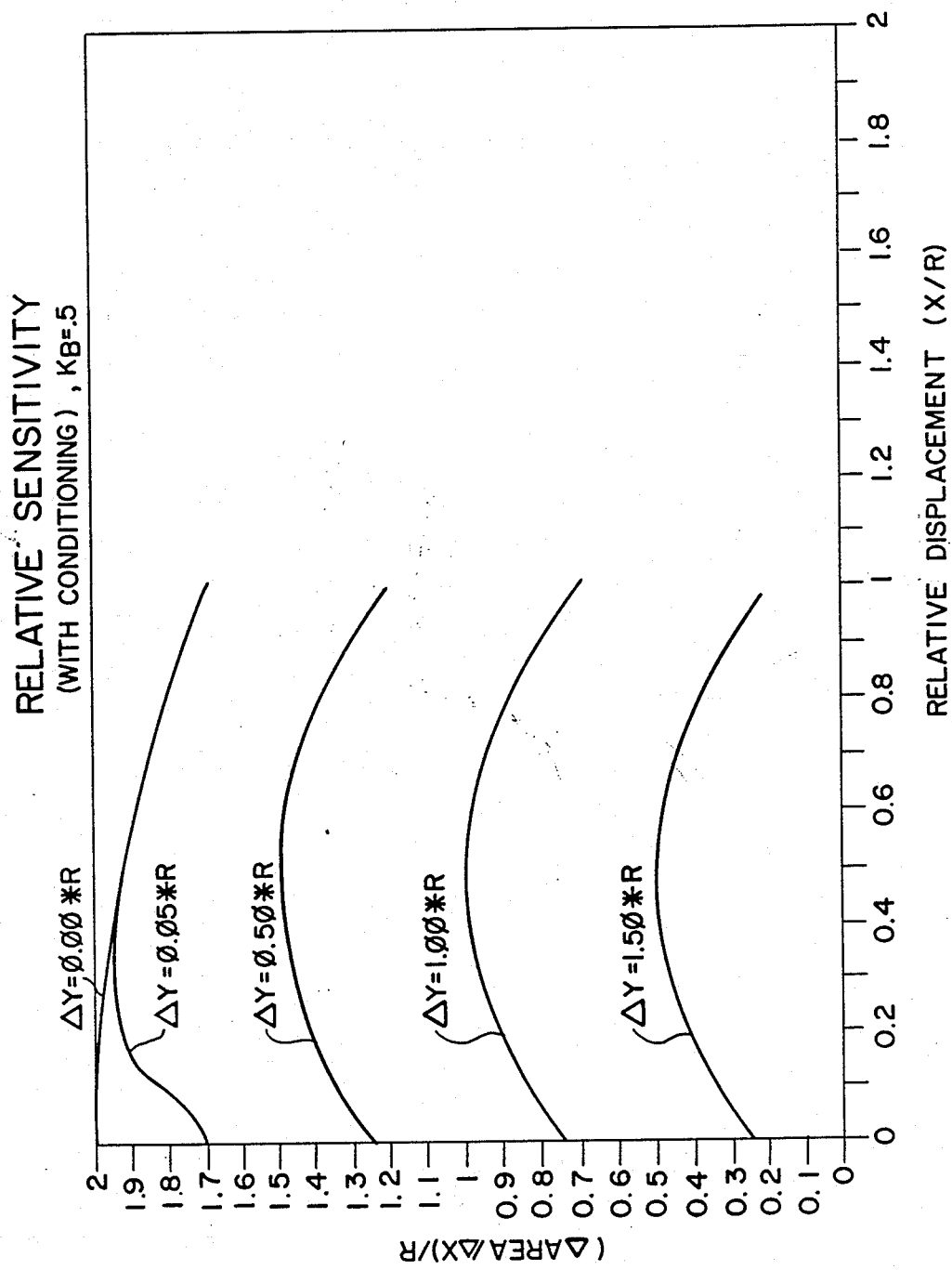
FIG. 5 is a graph of relative sensitivity versus displacement of a pair of misaligned optical fiber cables each having a chord shaped portion of their respective ends blocked.

Referring now to FIG. 4, relative sensitivity of the apparatus without any blockage of the optical fiber cable ends 34 and 38 is shown versus relative displacement of the cable ends. As can be seen, sensitivity increases as $\Delta Y$ misalignment decreases, and for each $\Delta Y$ misalignment shown, sensitivity passes through a maximum as displacement along the X axis increases. FIG. 5 illustrates apparatus sensitivity with a portion of the optical fiber end cables 34 and 38 blocked. In this case, one-half of the radius of each optical fiber cable end 34 and 38 is blocked, i.e., the blockage ratio $K_B$, which is defined as distance H divided by radius R, is equal to 0.5. By comparing FIG. 5 with FIG. 4, it can be seen that even though the maximum sensitivity for any $\Delta Y$ misalignment is the same for blocked or unblocked optical fiber cable ends, the sensitivity of the optical fiber cables having a portion of their ends blocked is much less dependent upon alignment along the X axis than with unblocked optical fiber cable ends. Thus, there is no need for a special adjustment of relative position of the ends of the optical fiber cables along the X axis when a portion of the optical fiber cable ends are blocked since adequate sensitivity is present upon any transmission of light between the optical fiber cables 12 and 14.

Figure 6:
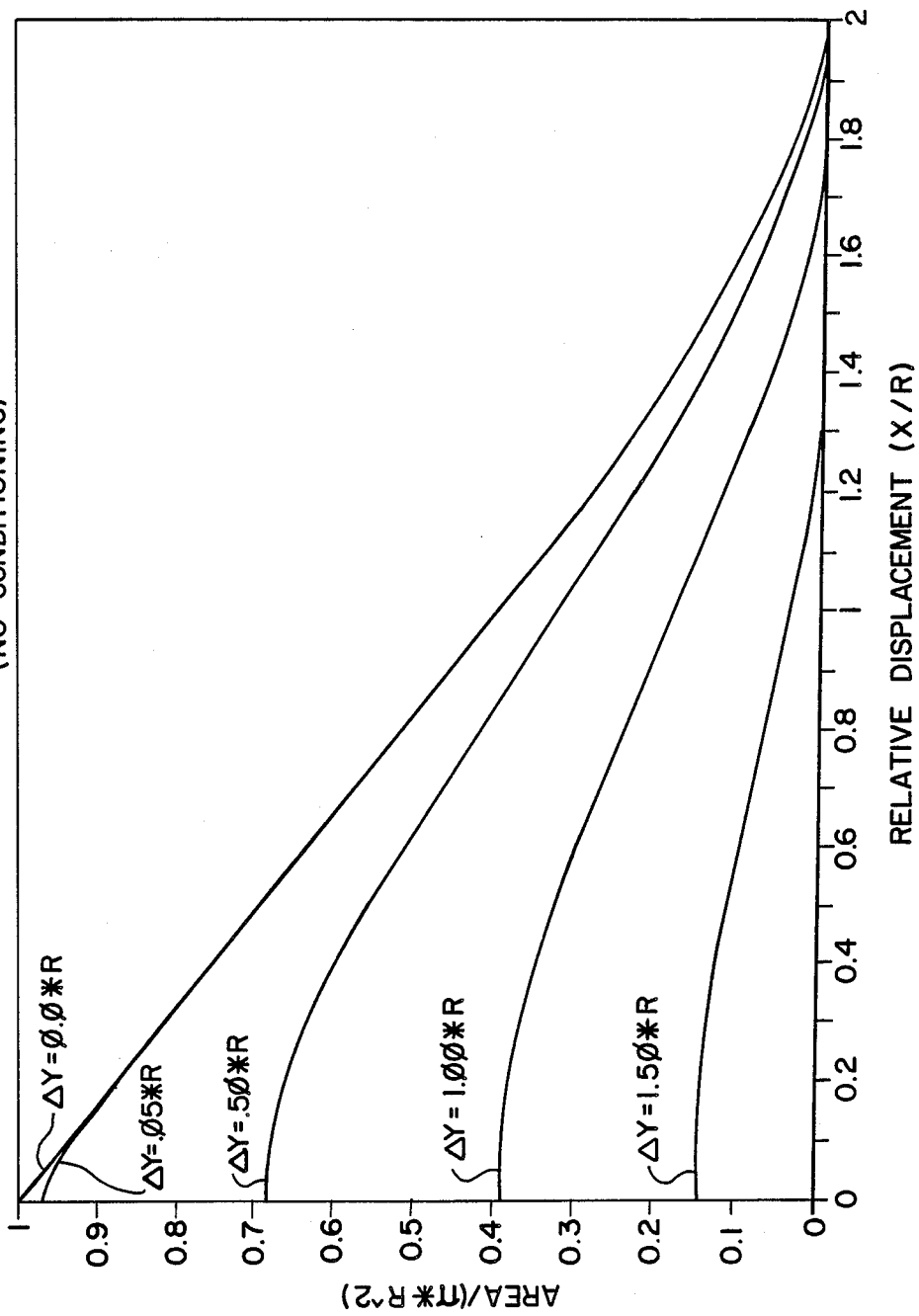
FIG. 6 is a graph of relative transmission versus displacement of a pair of misaligned optical fiber cables having ends that are not blocked.
Figure 7:
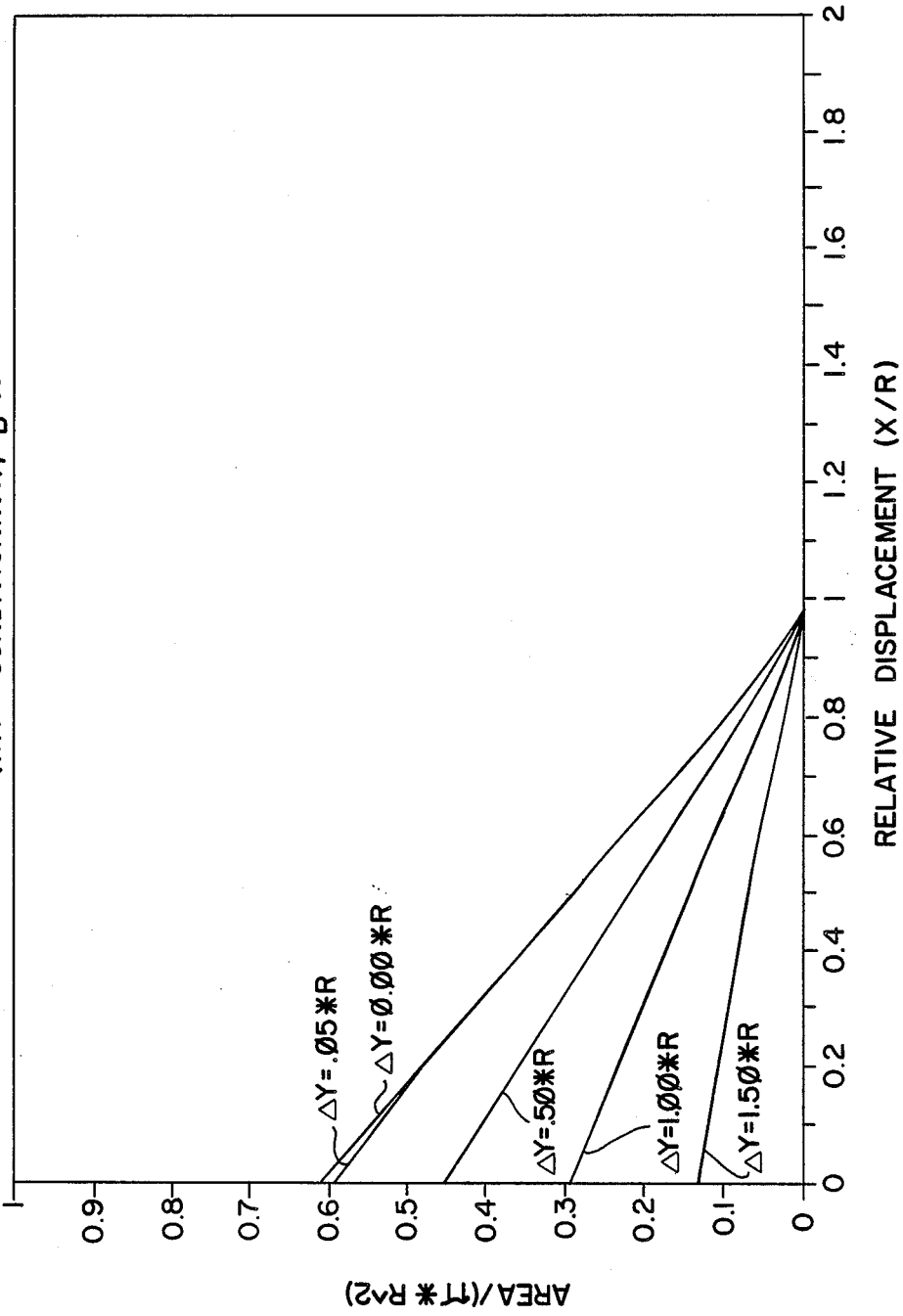
FIG. 7 is a graph of relative transmission versus displacement of a pair of misaligned optical fiber cables each having a chord shaped portion of their respective ends blocked.

Even though sensitivity is improved by blocking a portion of the optical fiber cable ends, i.e., sensitivity is much less dependent upon alignment of the optical fiber cable ends along the axis of displacement, the level of transmission is reduced, as can be seen by comparing FIGS. 6 and 7 which illustrate relative transmission versus relative displacement for unblocked optical fiber cable ends and blocked optical fiber cable ends, respectively. Although the level of light transmitted is reduced by blocking a portion of the ends of the optical fiber cables 12 and 14, the resulting light level transmitted is well above the sensitivity threshold levels of most conventional light receivers. When large $\Delta Y$ misalignments exist, the transmission levels for blocked and unblocked optical fiber cable ends are nearly equal. In addition, blocking a portion of the ends 34 and 38 of optical fiber cables 12 and 14, respectively, linearizes transmission with respect to displacement, as illustrated in FIG. 7. Such linearization permits the development of a linear device for sensing small displacements. Possible applications for such a linear device are pressure transducers or accelerometers.

Figure 8:
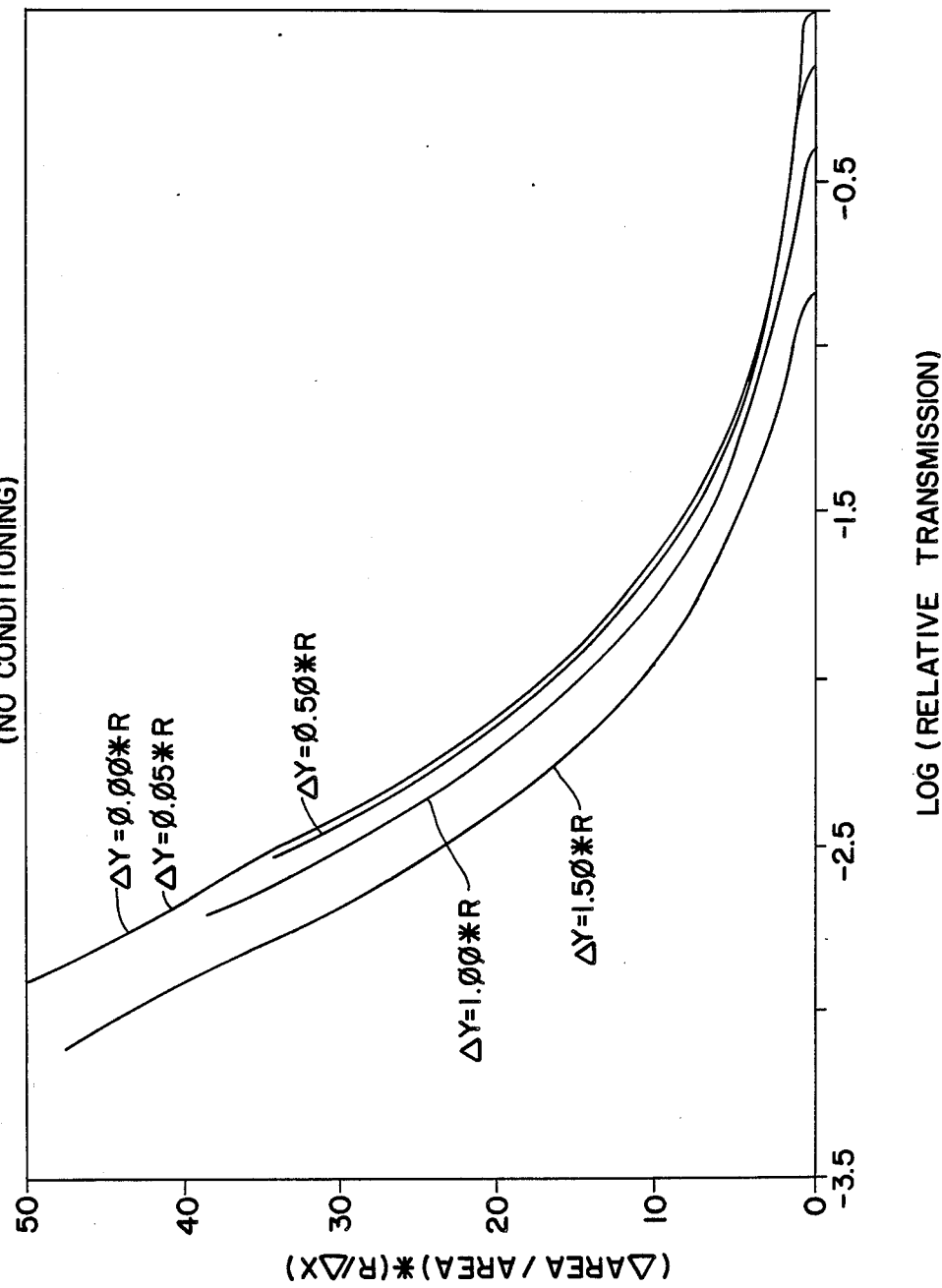
FIG. 8 is a graph of relative modulation versus displacement of a pair of misaligned optical fiber cables having ends that are not blocked.
Figure 9:
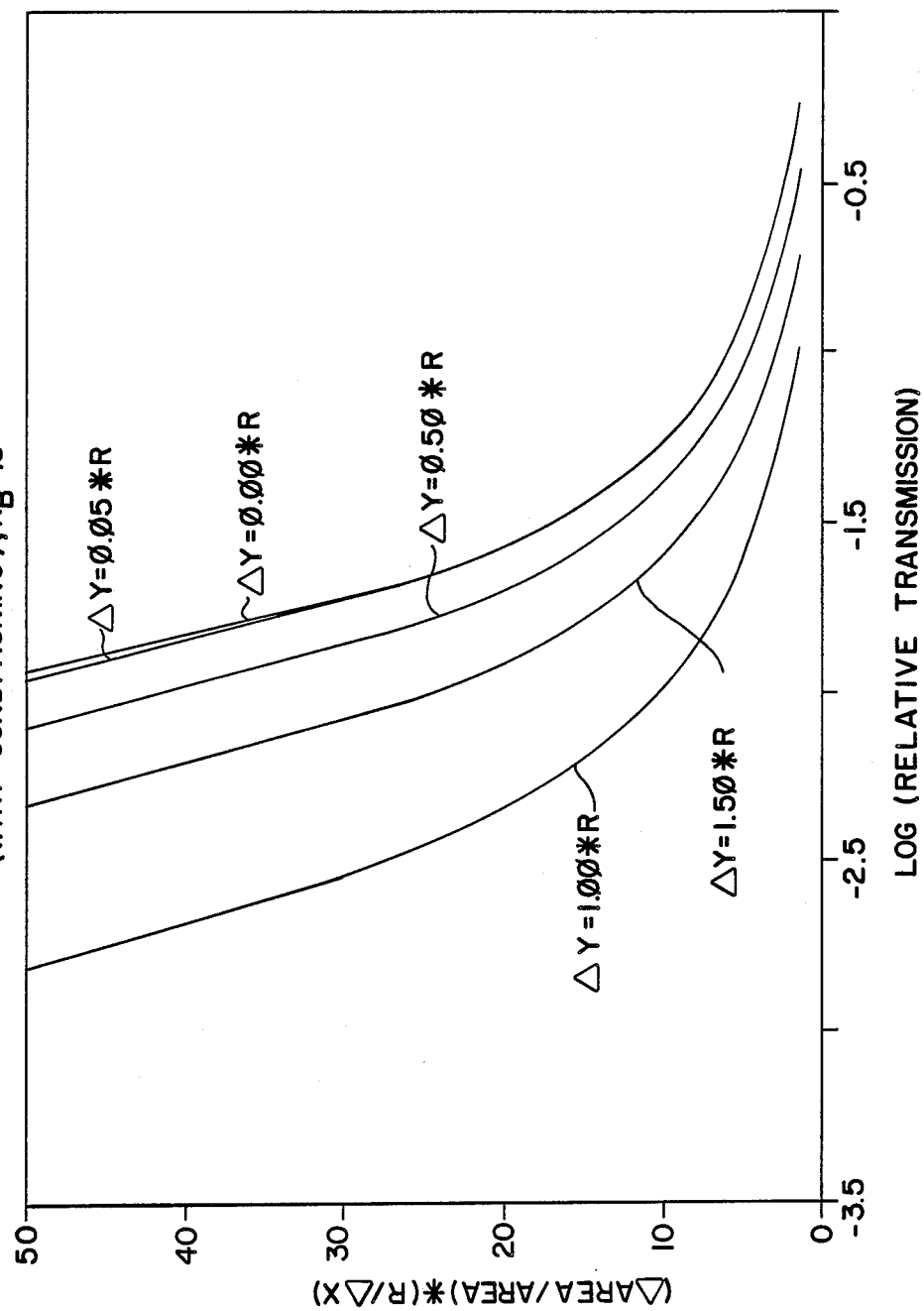
FIG. 9 is a graph of relative modulation versus displacement of a pair of misaligned optical fiber cables each having a chord shaped portion of their respective ends blocked.

Although light transmission is reduced when a portion of the ends 34, 38 of the optical fiber cables 12, 14 is blocked, relative modulation is significantly higher. This is apparent by comparing FIGS. 8 and 9 which illustrate relative modulation versus relative displacement for unblocked optical fiber cable ends and blocked optical fiber cable ends, respectively.

When displacements to be measured are very small, a relative change (otherwise referred to as a ratio, or a log-difference) in transmission level is of importance, not an absolute difference in light transmission. Thus, a device utilizing the blocked optical fiber ends will be significantly more sensitive than the prior art.

Certain modifications and improvements will occur to those skilled in the art upon reading the foregoing. It should be understood that all such modifications and improvements have been deleted herein for the sake of conciseness and readability, but are properly within the scope of the following claims.

I claim:

1. Apparatus in a displacement sensor for aligning the end of a first optical fiber cable adjacent the end of a second optical fiber cable along one axis of a co-ordinate set of axes comprising:
   a dual cantilever beam member having a first portion and a second portion displaceable relative to said first portion, said beam member retaining said first and second optical fiber cables in a spaced apart relationship and permitting said second optical fiber cable to be displaced relative to said first optical fiber cable along one axis of said co-ordinate set of axes while preventing displacement of said second optical fiber cable relative to said first optical fiber cable along the other axes of said co-ordinate set of axes and wherein a portion of said one end of said first optical fiber cable and a portion of said one end of said second optical fiber cable are blocked preventing the transmission of light therethrough to increase displacement sensitivity; and
   means for retaining said first beam member portion stationary during displacement of said second beam member portion and said second optical fiber cable relative thereto.

2. The apparatus as defined in claim 1 wherein said beam member retains and positions one end of said first optical fiber cable so as to be adjacent to and oppositely disposed from one end of said second optical fiber cable.

3. The apparatus as defined in claim 1 wherein said beam member further includes an intermediate portion interposed between and connecting said first and second beam member portions.

4. The apparatus as defined in claim 3 wherein said intermediate portion comprises a pair of spaced apart members which interconnect said first and second beam member portions.

5. The apparatus as defined in claim 4 wherein said pair of spaced apart members are substantially parallel to one another.

6. The apparatus as defined in claim 1 wherein said first and second beam member portions each have a bore provided therethrough permitting one end of said first optical fiber cable to be received through and attached to said bore in said first beam member portion and permitting one end of said second optical fiber cable to be received through and attached to said bore in said second beam member portion.

7. The apparatus as defined in claim 6 wherein said bore in said first beam member portion is in alignment with said bore in said second beam member portion.

8. The apparatus as defined in claim 7 wherein said alignment of said bores in said first and second beam member portions is substantially perpendicular to said one axis of displacement of said second optical fiber cable relative to said first optical fiber cable.

9. The apparatus as defined in claim 2 further including a light source connected to the other end of said first optical fiber cable and a light receiver connected to the other end of said second optical fiber cable.

10. The apparatus as defined in claim 1 wherein said first and second optical fiber cable end portions are chord shaped in configuration.

11. The apparatus as defined in claim 10 wherein said chord shaped portion on said one end of said first optical fiber cable is oppositely disposed from said chord shaped portion on said one end of said second optical fiber cable.

12. The apparatus as defined in claim 1 wherein said first and second optical fiber cable end portions are blocked by a light absorbing/reflecting film.

* * * * *